No. 794,224. PATENTED JULY 11, 1905.
E. HILL.
TRANSMISSION GEARING.
APPLICATION FILED JAN. 3, 1905.
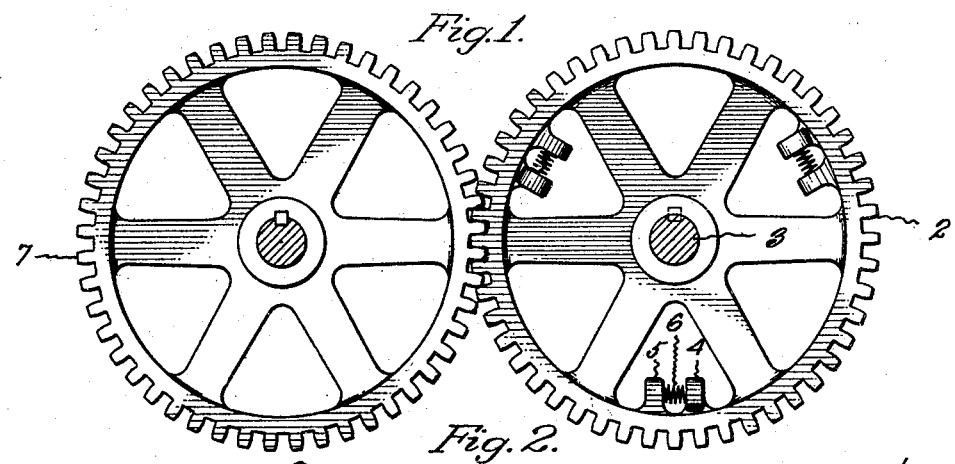
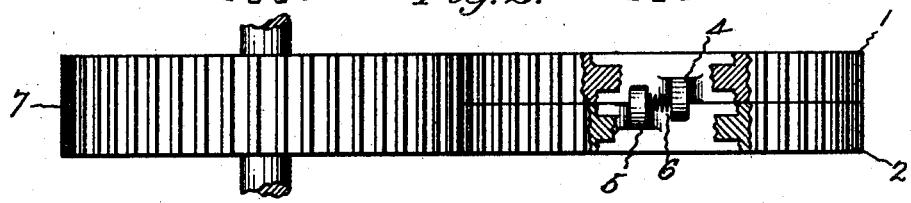
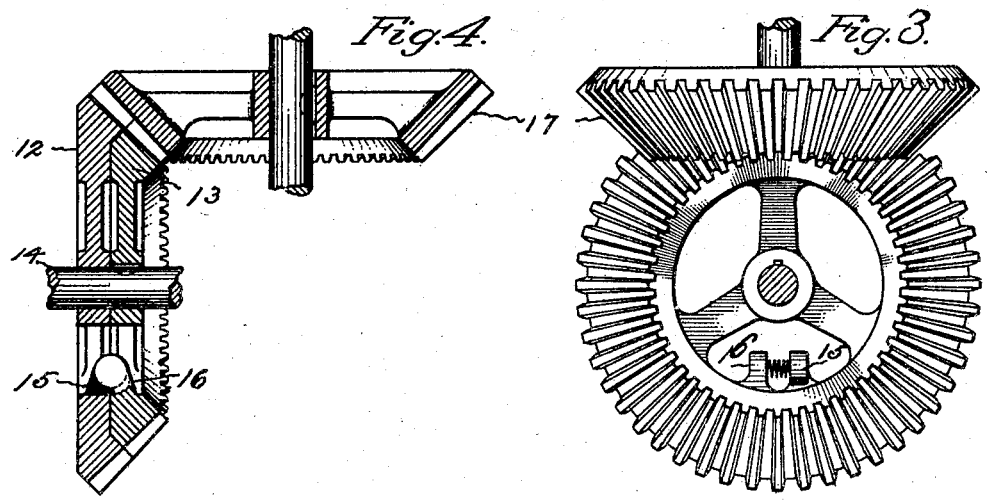
Witnesses.
C. H. Storrs
E. M. Lowe.
Inventor.
Ebenezer Hill
per
Harry P. Williams
Attorney.

No. 794,224. Patented July 11, 1905.

UNITED STATES PATENT OFFICE.

EBENEZER HILL, OF NORWALK, CONNECTICUT.

TRANSMISSION-GEARING.

SPECIFICATION forming part of Letters Patent No. 794,224, dated July 11, 1905.

Application filed January 3, 1905. Serial No. 239,394.

*To all whom it may concern:*

Be it known that I, EBENEZER HILL, a citizen of the United States, residing at Norwalk, in the county of Fairfield and State of Connecticut, have invented a new and useful Transmission-Gearing, of which the following is a specification.

This invention relates to the construction of toothed gearing which is designed to transmit power from one shaft to another.

The object of the invention is to eliminate backlash and noise from transmission-gearing.

This invention resides in a set of gears which is so constructed that sections of the teeth of one member press oppositely against the walls of adjacent teeth of the other member and completely fill the spaces between the intermeshing teeth as the members roll together.

Figure 1 of the accompanying drawings shows a face view of a set of intermeshing spur-gears that embodies the invention. Fig. 2 shows an edge view, with a part of one gear broken away, of this set of spur-gears. Fig. 3 shows a face view of a set of bevel-gears. Fig. 4 shows a section of a set of bevel-gears that embodies the invention.

One member of the gearing is formed in sections or is composed of a pair of gears 1 and 2 of the same size, number of teeth, and pitch of teeth placed side by side. The section 1 is keyed or otherwise fastened firmly to the shaft 3, while the section 2 is loose—that is, is free to rotate on the shaft.

Projecting inwardly from the rim of the section 1 is a lug 4. Projecting inwardly from the section 2 is a lug 5. These lugs are arranged adjacent to each other, and placed between them is a spring 6. There may be any desired number of these lugs with springs between them arranged about the rims of these sections of this member of the gearing.

The member 7 is a single gear of the desired diameter and number of teeth with a face approximately as wide as the face of both sections of the other member.

When the members of the gearing are in mesh, the springs pressing between the lugs which project from the rims of the sections of the divided member tend to force one member one way and the other member the other way, and this causes the teeth on one section to press against one side of the teeth on the single member and the teeth on the other section to press against the other side of the teeth on the single member. The result of this is that the spaces between the teeth on the single member, as the teeth roll together, are completely filled and all backlash prevented and noise eliminated. All wear is taken up in this manner for the reason that as the spaces between the teeth become larger the springs simply push one section more in advance of the other.

One member of the bevel-gearing which is illustrated may be formed of two sections 12 and 13, which may be merely two gears placed together, one being keyed to and the other loose on the shaft 14. A lug 15 may project from one section, and a lug 16 may project from the other section, and a spring may be placed between these lugs, so as to tend to separate the sections or keep the teeth of one in advance of the teeth of the other. The section 17 of this gearing is merely a single common gear having a face wide enough for its teeth to engage both sections of the other member.

The invention claimed is—

Transmission-gearing having two intermeshing toothed members, one member being formed of a single piece and the other being formed of corresponding sections, opposing lugs projecting radially inward from the rims of both of the sections, and spiral springs thrusting between the opposing lugs and tending to force the teeth of the sections out of alinement, substantially as specified.

EBENEZER HILL.

Witnesses:
E. HILL, Jr.,
L. C. DOWNS.